Oct. 25, 1949.  J. W. ROBERTSON  2,485,660
DESTRUCTION OF ORGANISMS
Filed April 29, 1946  2 Sheets-Sheet 1
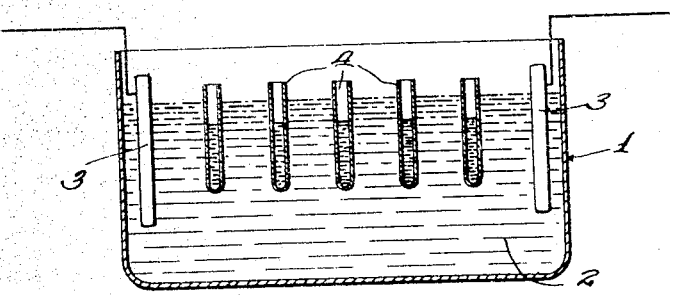
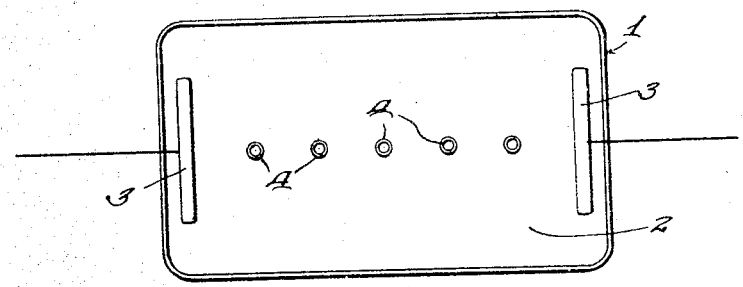
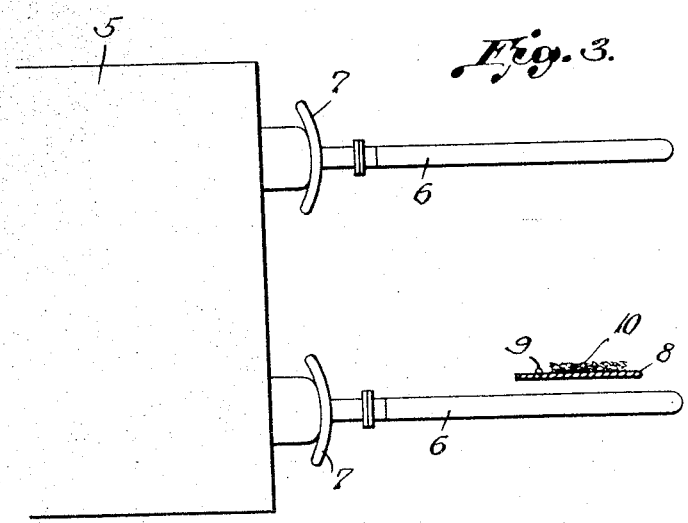
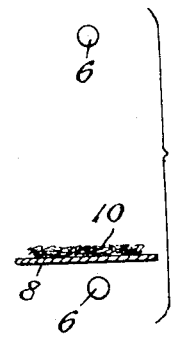
INVENTOR.
John W. Robertson
BY
Sol Shappirio
ATTORNEY.

Oct. 25, 1949.　　　　J. W. ROBERTSON　　　　2,485,660
DESTRUCTION OF ORGANISMS
Filed April 29, 1946　　　　　　　　　　　　2 Sheets-Sheet 2
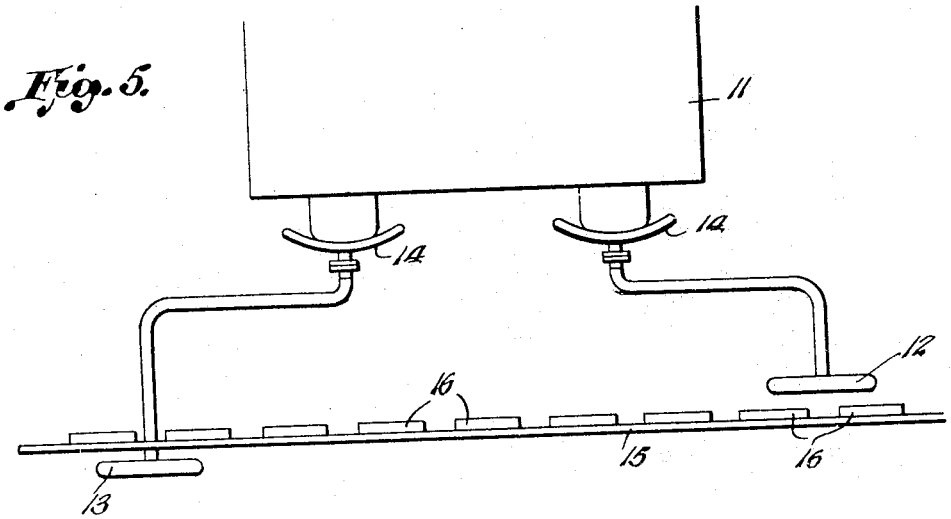
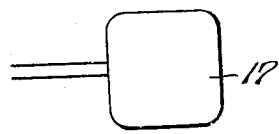
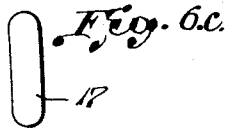
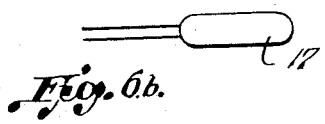
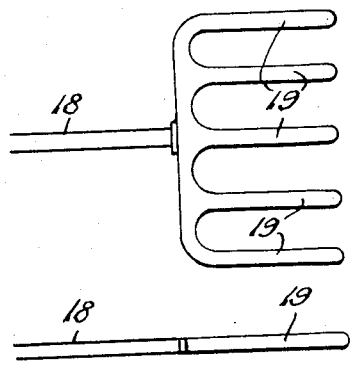
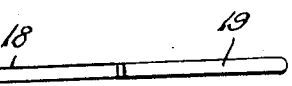
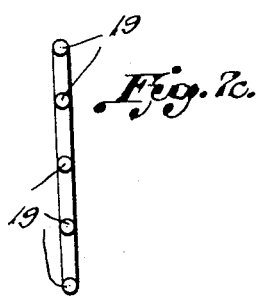
INVENTOR.
John W. Robertson
BY Sol Shappirio
ATTORNEY.

Patented Oct. 25, 1949

2,485,660

UNITED STATES PATENT OFFICE 2,485,660

DESTRUCTION OF ORGANISMS

John W. Robertson, Englewood, N. J., assignor, by direct and mesne assignments, of one-half to Ellis-Foster Company, Montclair, N. J., a corporation of New Jersey, and one-half to Montclair Research Corporation, a corporation of New Jersey Application April 29, 1946, Serial No. 665,680

11 Claims. (Cl. 99—221)

This invention relates to the destruction of organisms, particularly small organisms such as infect food products or other materials in particulate condition and includes methods and apparatus for such operations as well as the products resulting therefrom.

While high frequency power in the frequency range of 1 megacycle (mc.) to 100 mc. has been used for the heating of "dielectric" types of materials and the art has grown rapidly in recent years, no attention has been given to other useful effects which can be derived from the use of high frequency power phenomena as described hereinafter. Induction heating by the use of magnetic fields produced at frequencies below 1 mc. has been practiced for many years, and induction heating may be used at still higher frequencies when only surface heating, useful chiefly for heating metals is involved. Commonly voltages of the order of 5000 volts above ground potential or less are employed. Although some apparatus in commercial use develops upward of 10,000 volts between plates of the dielectric heating condenser, this is effectively only about 5000 volts above ground potential on each plate—one positive with respect to the other during any given cycle.

Despite those developments in the art, there appears to have been no attempt to use other high frequency phenomena and in fact these other phenomena appear to have gone unnoticed in restriction of the high frequency power and its effects to induction or dielectric heating.

Among the objects of the present invention is the utilization of high frequency power in the destruction of small organisms utilizing effects other than heat development.

Other and further objects of the present invention will appear from the more detailed description set forth below, it being understood that such more detailed description is given by way of illustration and explanation only and not by way of limitation, since various changes therein may be made by those skilled in the art without departing from the scope and spirit of the present invention.

In connection with that more detailed description, there is shown in the drawings, in Figure 1, an elevation partly in section of apparatus illustrating certain phenomena utilized in the present invention; in Figure 2, a top plan view of the apparatus of Figure 1; in Figure 3, one form of apparatus utilized in accordance with the present invention shown in side elevation; in Figure 4, an end view of the apparatus of Figure 3; in Figure 5, a further form of apparatus utilized in accordance with the present invention; in Figures 6a, 6b and 6c, top plan, side elevation, and end elevation views of one form of electrode that may be employed; and in Figures 7a, 7b and 7c, respectively, top plan, side elevation and end elevation views of another form of electrode utilized in accordance with the present invention.

In accordance with the present invention, radio frequency power of lethal voltage is employed in the destruction of small organisms such as insect life in all of various stages including egg, pupal, larval, and adult stages, as well as microorganisms including bacteria, molds, yeasts, etc. The small organisms to be destroyed may be treated per se and directly, or they may be present as infestations in food materials or other materials, particularly in particulate condition, as for example, larvae imbedded in bran, flour, etc. The principles involved herein are not a subdivision of induction or dielectric heating but a new field, and the phenomena described are very useful in application to materials and products not efficiently treated in induction or dielectric fields.

The present invention utilizes forces which come into play at higher voltages, particularly those above 5000 volts, and more particularly above 10,000 volts and more specifically when these voltages are applied to materials which are neither dielectrics or conductors in the best known sense of those words. In other words the stated materials will not heat effectively as a dielectric because they are too good as conductors and they will not heat effectively by induction because they are too good as insulators.

One way that may be utilized herein to define the nature of conductors can be based on the behavior of salt solutions. "Poor conductors," especially in the nature of salt solutions (or acid or alkali) comparable in dielectric and corona behavior with sodium chloride solutions stronger than about .05% will be affected by the "electrical field" or "corona discharge field" selectively, faster than surrounding media of "dielectric" behavior such as that of sodium chloride solutions below about .03% as set forth and further established. References herein to "corona discharge field," "invisible corona," "invisible discharges" and other corona phenomena are not to the visible corona discharge which is familiar to all but rather to the ionized field surrounding high voltage electrodes under suitable conditions and which apparently actually dissipates energy at levels too low to discharge through a concentrated, visible path in the well known corona phenomenon.

Principally in connection with the present invention "poor conductors" are subjected to treatment in a zone within the discharge field of high frequency power of lethal voltage where such poor conductors possibly act more as metallic particles would and become focal points for the initiation of such invisible discharges themselves, thus causing overheating and other effects on living organisms which are not yet well understood but which are often instantaneous in their action. The principle in use is to cause concentration of the electrical field or discharge on particles which may be "conductors" or "poor conductors" in that field. Primarily the invention is concerned in killing organisms surrounded by media of dielectric behavior different from that of the organism itself.

In carrying out the operations of the present invention, the killing effects of a high voltage electrode in proximity to the object to be affected is employed. For this purpose as stated, voltages of the order of 5000 above ground potential are useful but for best effectiveness, voltages of over 10,000 are employed. These voltages bring into play more effectively the phenomenon referred to herein and which will be referred to herein as corona discharge effect or invisible corona discharge effect. In so doing, no limitation is intended as the phenomenon may be described in other ways by physicists. It has been noted that at these voltages, visible corona discharges start from sharp metallic points and, surprisingly enough, from the surface of a conductive liquid such as a salt or acid or alkali solution. It appears then that vapors above the surface of the liquid behave in much the same manner as sharp edges or points of metal in initiating corona discharges (visible or invisible). These same solutions (all too conductive to heat effectively as a dielectric) will also heat in a partially enclosed space if placed in the vicinity of an electrode at high potential and particularly at frequencies above 1 mc. Lower frequencies may be useful at higher voltages but practical industrial considerations call for frequencies of the order of 30 mc. and above and at such voltage that a field of desired strength and extent is made for the proposed use. It has been shown that salt solutions heat inductively with increasing usefulness as frequency is increased but at frequencies below 1000 mc. this effect is not pronounced enough to be useful for destruction of insects, sterilization, etc., at high speeds.

To explain phenomena involved herein, the following example showing the range of concentration of salt solutions which can be effectively heated as a dielectric is given. Dielectric heating apparatus operating at about 20 mc. and 5000 volts between electrodes is set up so as to give a substantially uniform dielectric field through a quartz test tube containing the solution to be studied. The time required to boil various concentrations of sodium chloride solutions was determined and the relative heating rate of surface compared to body of liquid was noted.

| NaCl Conc. | Time to boil | Comments |
|---|---|---|
| None—distilled water. | 15° C. rise in 30 min. | Uniform heating. |
| .001% | 240 seconds | Do. |
| .005% | 80 seconds | Do. |
| .01% | 47 seconds | Do. |
| .02% | 40 seconds | Surface heats faster. |
| .03% | 43 seconds | Do. |
| .04% | 43 seconds | Do. |
| .05% | 49 seconds | Do. |
| .10% | 75 seconds | Do. |
| .50% | 215 seconds | Surface heats faster and boils first. |
| 1.00% | 1,000 seconds | Do. |

From these results it is seen that salt solutions under .04% concentration exhibit rapid heating as dielectrics but those over .04% do not heat so well as dielectrics and in fact the surfaces of stronger solutions heat so much faster than the under surface liquid, that boiling first takes place at the surface while the lower layers may still be 10° or 20° below boiling temperatures, thus indicating that the effective heating is not caused by dielectric heating but by other high frequency effects in which invisible corona discharge plays an important part.

Similar charts on phosphoric acid, hydrochloric acid, sodium sulfate, and p-toluene sulfonic acid all show maximum heating rate as dielectrics at concentrations below .05%. This is a small fraction of the salt concentration found in normal living cells, consequently it would not be expected that living cells, per se, would be subject to dielectric heating at a rapid rate with great efficiency. However, it would be expected that there would be obtained much more rapid and selective heating when placed near an electrode at high radio frequency voltage, than would take place at a point say half way between two plates of a dielectric heating condenser at the same electrode voltage.

This behavior may be demonstrated by vertically suspending two flat plates, for example 5 inches square, as electrodes in a kerosene bath. Kerosene is a good dielectric and heats very slowly in a dielectric field. With 10,000 volts across the plates, spaced at 8 inches, the kerosene will rise in temperature about 1° C. in 30 minutes. Five Pyrex test tubes filled with 0.1% salt solution suspended at equal spacings on a center line between the electrodes were subjected to the application of the radio frequency power. In five minutes the temperature of the salt solution in the tubes nearest the electrodes had increased 15° C. at the surface and 5° C. at the bottom, and the temperature in the tube half way between the plates had not increased measurably.

Apparatus utilized for this purpose is shown in Figures 1 and 2, in which the receptacle 1 contains the kerosene bath 2 in which the electrodes 3, 3 are suspended. The test tubes 4, 4, filled with the stated salt solution are suspended in the bath.

The above set up shows these deviations in relatively minor temperature changes but these slow changes enable more accurate temperature comparisons to be made by use of a fine thermocouple which can readily be placed at the desired point to give very quick readings. Increasing the voltage will bring a more rapid increase in the temperature closest to the electrode and by using aluminum foil electrodes to increase the invisible corona effect, the temperature rise was almost doubled in the test tubes nearest them while in the center no change was noted. Higher salt concentrations also increase the rate of temperature rise near the electrodes.

The above examples are good indications that little dielectric effect takes place in living cells placed between electrodes in a high frequency circuit. This is borne out somewhat in the practice of dielectric heating of packaged cereals and similar foods for purposes of killing possible weevil infestation, because the time involved is rather long, being of the order of a minute or more unless the available power is very great, and the entire contents of the package are heated up during the processing to the thermal death point of the organism involved. Using the "corona discharge" principle described above, it is possible to cause death in living organisms in a matter of seconds without appreciable heating of the surrounding media, and apparently with little rise in temperature of the organism itself as the killing effect is often instantaneous. In further support of this view, organisms such as relatively soft larvae were killed in the above described manner in 2 or 3 seconds and allowed to remain in the field with power on for as much as 15 minutes, during which time no charring and no apparent drying out took place.

For example, weevils and beetles placed on a piece of glass cloth (or other good dielectric) stretched between two horizontal electrodes, separated by a distance of six inches, and spaced about ⅛ inch from the lower electrode, are killed in about 5 seconds when the electrode is at about 5000 volts above ground potential. When the glass cloth is raised toward the second electrode, the effect decreases until at the center point between electrodes, which is at ground potential, the effect is not noticeable and the insects are not even disturbed on prolonged exposure to the dielectric field. This behavior shows that it is not dielectric effect, because heating would be the same at any point between the electrodes, this being the principle and the foundation of dielectric heating.

Further tests with larvae imbedded in bran, flour, and similar products, produced the kill in 5 or 6 seconds under similar conditions except that the effect was useful for at least 3 times the distance from the electrode. The surrounding medium was not heated more than 10° C. in the process, which means a considerable saving of power over the dielectric heating process and even more important, the size of the radio frequency power unit can be correspondingly less because it is high voltage which is needed rather than high wattage output of power available. This brings the original installation cost of equipment to such a point as to make it more interesting to all industries engaged in utilization of such methods. Voltages of the order of 50,000 or even greater may be used to extend the effect a greater distance from the electrode which does the work. Of course, more precautions in the design of electrodes and shielding are needed at these voltages, but it is certain that increases can be made so as to increase the effective killing range of the invisible discharge to a distance great enough to be useful in industry.

Apparatus that may be utilized for applying this method in the destruction of insects is illustrated in Figures 3 and 4. As there shown, a high voltage radio frequency generator 5 is provided having electrodes 6, 6, supplied with corona shields 7, 7. A continuous belt which may be of glass cloth 8, is moved between the electrodes at a point adjacent to the lower one, on which belt is deposited the organisms or material infested with organisms which are to be treated, one such organism being shown at 9, while material infested with organisms is shown at 10. Such operations enable continuous treatment of insects or other organisms or materials carrying such organisms to be subjected to treatment in accordance with the present invention.

By such operations, bulk sterilization or destruction of insects or other small organisms may be carried out in continuous operations which are equally practical and widely useful.

The materials to be treated may include food products or other materials in particulate condition carrying the organisms to be destroyed in the form of packaged goods. For the treatment of packaged goods, the packaged goods may be placed on a conveyor or continuous belt which moves such packaged goods continuously through the zone of treatment. The electrodes may be placed to give the desired effect in any desired manner and while desirably both electrodes should be placed close to the goods, the electrodes may be separated from each other a considerable distance. This is illustrated in the apparatus of Figure 5 in which the high voltage radio frequency generator 11 is provided with electrodes 12 and 13 having corona shields 14, 14. A continuous belt 15 carrying the packaged goods 16 moves within the treatment zone provided by the electrodes. Electrode 12 is placed close to the goods above the same, while the other electrode may be placed below the goods carried on the belt 15. In this way effective treatment of both sides of the package is obtained, permitting use of lesser voltages.

Any desired circuits can be utilized and the circuit may be designed so that one side of the output is grounded while only one high voltage lead is needed as a connection to the set-up. All such designs are well known to radio and electronic engineers and may be adapted to utilization in accordance with the present invention.

The form of electrode utilized may vary and various designs are useful. The flat plate type of electrode will not allow appreciable invisible corona at as low a voltage as other types but nevertheless it may be used. A straight bar or pipe across but below the conveyor belt as the packages or bulk materials pass over it, is more useful as long as its radius of curvature is large enough to prevent visible corona at the voltage employed. Another type of electrode found to be still more useful consists of glass base or other insulating material coated with a thin metallic layer of, for example, aluminum or silver. The coating should be only a few thousandths of an inch thick. Such coating is apparently rough enough to provide numerous discharge points for the invisible corona.

This is illustrated in the drawing. In Figure 6, a flat plate type of electrode is illustrated at 17 and may be that form which consists of a glass base or other insulating material coated with a thin metallic layer as illustrated above. Another form of electrode is shown in Figure 7 in which a bar or pipe, for example, of ½ inch diameter as shown at 18, the diameter being sufficient to concentrate the field effect around smaller radii, is provided with a series of electrode portions 19, 19, joined to the body portion 18.

Where the solid or plate type of electrode is employed, it may be either a solid or hollow "block" with wide radius of curvature at the edges. For example, a radius of curvature of 1 inch or more for voltages over 10,000 may be employed. Where these electrodes of the plate type consist of glass coated with metal, as for example, a coating of .001 to .005 inch thickness, the metal is desirably maintained in a roughened state as pointed out above, and should not be highly polished.

As pointed out above, effective use of the method is particularly concerned with the voltages as described above and more desirably voltages above 10,000 (electrode potential). It has been further noted that the effect of increasing frequency is rather pronounced due possibly to the fact that higher frequencies it is believed, tend to leave such terminal surfaces as described above, more readily than lower frequencies. This tendency to corona at lower voltages in the high frequencies may thus be emphasized in connection with the present invention and the increasing effects of high frequencies in the disclosed method supports the corona discharge theory as the cause of the killing field. But as explained, the phenomena are not to be restricted by the use of such terms as corona discharge because definite effects have been obtained whatever may be the explanation therefor or whether such explanation may lie along other lines.

While voltages have been particularly emphasized above with respect to the lethal effects obtained, it may be pointed out that frequencies of less than 30 mc. are effective but it is preferred to utilize frequencies above 30 mc. The effect of frequency may be illustrated as follows.

Using carpet bettle larvae and confused flour beetle in ground dog food medium, it was found when subjected to treatment in accordance with the present invention, a frequency of about 30 mc. was effective in about 5 seconds compared to about 7 seconds time at 20 mc. under conditions substantially the same. This example illustrates the effect in variation of frequency and the greater effectiveness of higher frequencies.

Having thus set forth my invention, I claim:

1. A method of destroying small organisms which comprises subjecting them to invisible corona discharge only produced by radio frequency power of lethal voltage at a temperature below the thermal death point of the organism.

2. The method as set forth in claim 1, in which the organisms are insects.

3. The method as set forth in claim 1, in which the organisms are microorganisms.

4. The method of destroying small organisms which comprises subjecting such organisms to invisible corona discharge only produced by radio frequency power.

5. A method of destroying small organisms which comprises supporting the organism dielectrically and subjecting the organism to invisible corona discharge only produced by radio frequency power of lethal voltage.

6. A method of destroying small organisms which comprises supporting the organism dielectrically and moving the organism through a zone where it is subjected to invisible corona discharge only produced by radio frequency power of lethal voltage.

7. A method of treating materials, in particulate condition, infested with organisms which comprises supporting such material dielectrically and moving the material through a zone where it is subjected to invisible corona discharge only produced by radio frequency power of lethal voltage.

8. The method of claim 7, wherein the material is a packaged food product.

9. A method of treating materials, in particulate condition, infested with organisms which comprises moving the material continuously through a zone where it is subjected to invisible corona discharge only produced by radio frequency power of lethal voltage.

10. The method of claim 9, in which the material is a packaged food product.

11. A method of destroying small organisms which comprises subjecting such organisms in proximity to a single electrode to invisible corona discharge only produced by radio frequency power of lethal voltage at a frequency of the order of 1,000,000 cycles.

JOHN W. ROBERTSON.

REFERENCES CITED

The following references are of record in the file of this patent:

UNITED STATES PATENTS

| Number | Name | Date |
| --- | --- | --- |
| 2,122,741 | Haddad | July 5, 1938 |
| 2,223,813 | Brown | Dec. 3, 1940 |
| 2,228,783 | Smith | Jan. 14, 1941 |
| 2,257,541 | Smith | Sept. 30, 1941 |